United States Patent
Kim et al.

(10) Patent No.: US 8,194,749 B2
(45) Date of Patent: Jun. 5, 2012

(54) METHOD AND APPARATUS FOR IMAGE INTRAPREDICTION ENCODING/DECODING

(75) Inventors: So-young Kim, Yongin-si (KR); Jeong-hoon Park, Seoul (KR); Sang-rae Lee, Suwon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1519 days.

(21) Appl. No.: 11/506,893

(22) Filed: Aug. 21, 2006

(65) Prior Publication Data

US 2007/0041450 A1 Feb. 22, 2007

(30) Foreign Application Priority Data

Aug. 20, 2005 (KR) ..................... 10-2005-0076545

(51) Int. Cl.
*H04N 11/02* (2006.01)
*H04N 11/04* (2006.01)
*H04N 7/12* (2006.01)

(52) U.S. Cl. .................. 375/240.24; 375/240.12
(58) Field of Classification Search ............ 375/240.12, 375/240.24, 240.26
See application file for complete search history.

(56) References Cited

U.S. PATENT DOCUMENTS

| | | | |
|---|---|---|---|
| 6,724,818 B1 * | 4/2004 | Frojdh et al. ............. | 375/240.07 |
| 7,336,720 B2 * | 2/2008 | Martemyanov et al. . | 375/240.12 |
| 7,706,446 B2 * | 4/2010 | Hamamatsu et al. .... | 375/240.16 |
| 7,822,119 B2 * | 10/2010 | Boon et al. ............... | 375/240.12 |
| 2003/0206594 A1 * | 11/2003 | Zhou ......................... | 375/240.16 |
| 2004/0179610 A1 * | 9/2004 | Lu et al. ................... | 375/240.25 |
| 2005/0276326 A1 * | 12/2005 | Drezner ................... | 375/240.12 |
| 2006/0072676 A1 * | 4/2006 | Gomila .................... | 375/240.27 |

FOREIGN PATENT DOCUMENTS

KR 10-2004-0106409 A 12/2004

OTHER PUBLICATIONS

Mathias Wien, Variable Block-Size Transforms for H.264/AVC, 2003, IEEE Transactions on Circuits and Systems for Video Technology, vol. 13, No. 7, pp. 604-613.*
"The Intra Prediction Based on Sub Block"—Zhu Gang et al. (Sep. 4, 2004) pp. 467-469 vol. 1.
Martin Fiedler, "Implementation of a Basic H.264/AVC Decoder", Jun. 2004, pp. 1-28.
Ian E G Richardson, "H.264/MPEG-4 Part 10 White Paper", Apr. 2003, pp. 1-6.

* cited by examiner

*Primary Examiner* — Joseph Ustaris
*Assistant Examiner* — Hang Gao
(74) *Attorney, Agent, or Firm* — Sughrue Mion, PLLC

(57) ABSTRACT

Provided is a method and apparatus for image intraprediction encoding/decoding. The method for image intraprediction encoding includes an intraprediction unit which divides an input block into at least one first sub-block of a predetermined size, and performing intraprediction encoding on the at least one first sub-block according to a first sub-block processing order using pixel values of at least adjacent sub-blocks located to the right of and/or below the at least one first sub-block.

14 Claims, 14 Drawing Sheets

ONE SAMPLE OR PIXEL

FIG. 4A (PRIOR ART)

| 0 | 1 | 2 | 3 |
|---|---|---|---|
| 4 | 5 | 6 | 7 |
| 8 | 9 | 10 | 11 |
| 12 | 13 | 14 | 15 |

FIG. 4B (PRIOR ART)

| 0 | 1 | 4 | 5 |
|---|---|---|---|
| 2 | 3 | 6 | 7 |
| 8 | 9 | 12 | 13 |
| 10 | 11 | 14 | 15 |

ADJACENT PIXELS USED FOR INTRAPREDICTION

CURRENT SUB-BLOCK TO BE INTRAPREDICTED

FIG. 7G

| 15 | 11 | 7 | 3 |
|----|----|---|---|
| 14 | 10 | 6 | 2 |
| 13 | 9  | 5 | 1 |
| 12 | 8  | 4 | 0 |

| 5  | 4  | 1  | 0  |
|----|----|----|----|
| 7  | 6  | 3  | 2  |
| 13 | 12 | 9  | 8  |
| 15 | 14 | 11 | 10 |

FIG. 7I

| 15 | 13 | 7 | 5 |
|----|----|---|---|
| 14 | 12 | 6 | 4 |
| 11 | 9  | 3 | 1 |
| 10 | 8  | 2 | 0 |

| 10 | 11 | 14 | 15 |
|----|----|----|----|
| 8  | 9  | 12 | 13 |
| 2  | 3  | 6  | 7  |
| 0  | 1  | 4  | 5  |

10j

METHOD AND APPARATUS FOR IMAGE INTRAPREDICTION ENCODING/DECODING

CROSS-REFERENCE TO RELATED PATENT APPLICATION

This application claims priority from Korean Patent Application No. 10-2005-0076545, filed on Aug. 20, 2005, in the Korean Intellectual Property Office, the disclosure of which is incorporated herein in its entirety by reference.

BACKGROUND OF THE INVENTION

1. Field of the Invention

The present invention relates to the intraprediction of an image and, more particularly, to a method and apparatus for image intraprediction encoding/decoding to improve image compression efficiency.

2. Description of the Related Art

In image compression standards such as moving picture expert group (MPEG)-1, MPEG-2, MPEG-4 Visual, H.261, H.263, and H.264 standards, a picture is generally divided into macroblocks for video encoding. After each of the macroblocks is encoded in all interprediction and intraprediction encoding modes, bit rates required for encoding the macroblock and rate-distortion (RD) costs for the encoding modes are compared. Then an appropriate encoding mode is selected according to the results of the comparison and the macroblock is encoded in the selected encoding mode.

In intraprediction, instead of referring to reference pictures, a prediction value of a macroblock to be encoded is calculated using a pixel value of a pixel that is spatially adjacent to the macroblock to be encoded and a difference between the prediction value and the pixel value is encoded when encoding macroblocks of a current picture.

Figures 1, 2:
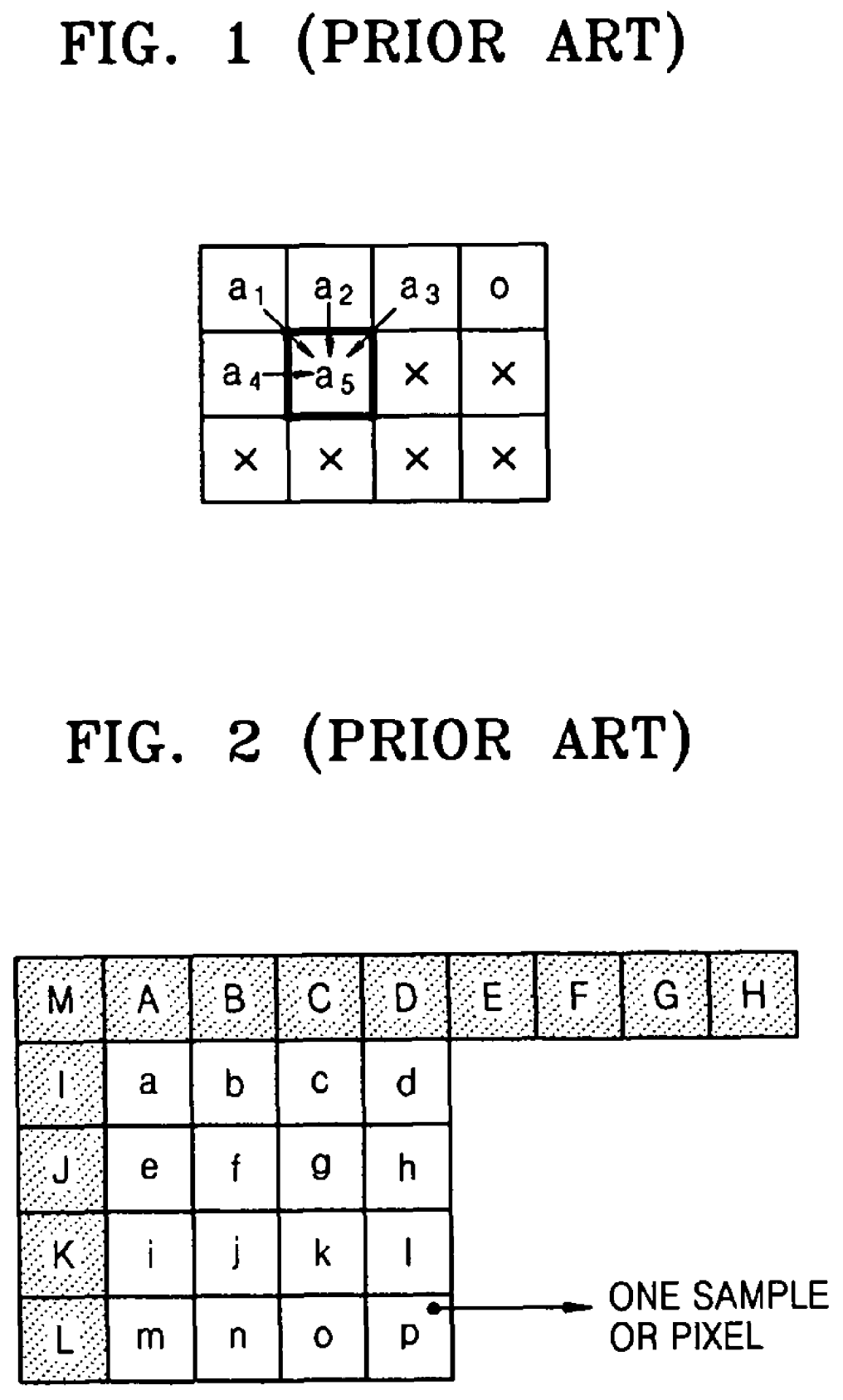

FIG. 1 illustrates the use of previous macroblocks for the intraprediction of a current macroblock a according to the prior art.

Referring to FIG. 1, previous macroblocks $a_1$, $a_2$, $a_3$, and $a_4$ are used for the intraprediction of the current macroblock $a_5$. According to a raster scan scheme, macroblocks included in a picture are scanned left-to-right and top-to-bottom. Thus, the previous macroblocks $a_1$, $a_2$, $a_3$, and $a_4$ are scanned and encoded before the current macroblock $a_5$. Because they are not encoded, macroblocks marked with an X cannot be used for predictive encoding of the current macroblock $a_5$. Because they have low correlation with the current macroblock $a_5$, macroblocks marked with O are not used for predictive encoding of the current macroblock $a_5$. After being transformed using a discrete cosine transform (DCT) and quantized, the previous macroblocks $a_1$, $a_2$, $a_3$, and $a_4$ are inversely quantized and inversely transformed using a DCT and then reconstructed.

FIG. 2 is a reference diagram indicating adjacent pixels used in 4×4 intra modes of the H.264 standard according to the prior art.

Referring to FIG. 2, lower-case letters a through p indicate pixels of a 4×4 block to be predicted, and upper-case letters A through M located above and to the left of the 4×4 block indicate adjacent samples or pixels that are required for intraprediction of the 4×4 block and have already been encoded and reconstructed.

FIG. 3 illustrates 4×4 intra modes used in the H.264 standard according to the prior art.

Referring to FIG. 3, there are nine 4×4 intra modes, i.e., a direct current (DC) mode, a vertical mode, a horizontal mode, a diagonal down-left mode, a diagonal down-right mode, a vertical left mode, a vertical right mode, a horizontal up mode, and a horizontal down mode. In the 4×4 intra modes, pixel values of pixels a through p are predicted from pixels A through M of adjacent macroblocks. As illustrated in FIG. 3, in the 4×4 intra modes, adjacent pixels in a frame including a block to be intrapredicted are used as reference pixels. As such, in an intraprediction method according to the prior art, a prediction value of a macroblock to be encoded is calculated using pixel values of pixels that are spatially adjacent to the macroblock to be encoded.

FIGS. 4A and 4B illustrate processing orders of 4×4 blocks included in a macroblock in a 4×4 intra mode according to prior art.

According to a processing order of 4×4 blocks in the H.264 standard, 4×4 blocks included in a single macroblock are processed in numerical order based on the numbers indicated in the blocks of FIG. 4A, i.e., left-to-right and top-to-bottom.

Since a current 4×4 block can be intrapredicted using only pixel values of pixels located above and to the left of the current 4×4 block as illustrated in FIG. 2, an improved encoding method is required to improve encoding efficiency.

SUMMARY OF THE INVENTION

An aspect of the present invention provides a method and apparatus for image intraprediction encoding/decoding in which intraprediction is performed in various modes according to modified block processing orders in addition to conventional block processing orders.

Another aspect of the present invention provides a method and apparatus for image intraprediction encoding/decoding in which image compression efficiency can be improved by performing intraprediction in various modes.

According to one aspect of the present invention, there is provided a method of image intraprediction encoding. The method includes dividing an input block into at least one first sub-block of a predetermined size and performing intraprediction encoding on the at least one first sub-block according to a first sub-block processing order using pixel values of at least adjacent sub-blocks located to the right of and/or below the at least one first sub-block.

According to another aspect of the present invention, there is provided an apparatus for image intraprediction encoding. The apparatus includes an intraprediction unit that divides an input block into at least one first sub-block of a predetermined size and performs intraprediction encoding on the at least one first sub-block according to a first sub-block processing order using pixel values of at least adjacent sub-blocks located to the right of and/or below the at least one first sub-block.

According to still another aspect of the present invention, there is provided a method of image intraprediction decoding in which a bitstream of an encoded image is received and intraprediction decoded. The method includes extracting intraprediction mode information from the bitstream, selecting, based on the extracted intraprediction mode information, one of at least one sub-block processing order that allows the use of pixel values of adjacent sub-blocks to the right of and/or below a current sub-block for intraprediction decoding, and performing intraprediction decoding on sub-blocks according to the selected sub-block processing order, thereby forming a predicted block.

According to yet another aspect of the present invention, there is provided an apparatus for image intraprediction decoding in which a bitstream of an encoded image is received and intraprediction decoded. The apparatus includes an extracting unit and an intraprediction unit. The extracting unit extracts intraprediction mode information from the bitstream. The intraprediction unit selects, based on the extracted intraprediction mode information, one of at least one sub-block processing order that allows the use of pixel values of adjacent sub-blocks to the right of and/or below a current sub-block for intraprediction decoding, and performs intraprediction decoding on sub-blocks according to the selected sub-block processing order, thereby forming a predicted block.

BRIEF DESCRIPTION OF THE DRAWINGS

The above aspects of the present invention will become more apparent by describing in detail exemplary embodiments thereof with reference to the attached drawings in which:

FIG. 1 illustrates the use of previous macroblocks for the intraprediction of a current macroblock according to the prior art;

FIG. 2 is a reference diagram indicating adjacent pixels used in 4×4 intra modes of the H.264 standard according to the prior art;

FIGS. 4A and 4B illustrate processing orders of 4×4 blocks included in a macroblock in a 4×4 intra mode according to the prior art;

FIGS. 7A through 7J illustrate processing orders in which an intraprediction performing unit of FIG. 6 processes sub-blocks;

DETAILED DESCRIPTION OF THE EXEMPLARY EMBODIMENTS OF THE INVENTION

In some images, it may be desirable in terms of compression efficiency to perform intraprediction using pixel values of blocks located below or to the right of a current block to be intrapredicted. According to a conventional block processing order, since blocks located below or to the right of a current block are not yet processed, they cannot be used even when their use provides high compression efficiency. An exemplary embodiment of the present invention provides a new block processing order in which intraprediction can be performed using pixel values of blocks located below or to the right of a current block in addition to a conventional block processing order, and a method and apparatus for image intraprediction encoding/decoding using the new block processing order.

Figure 5:
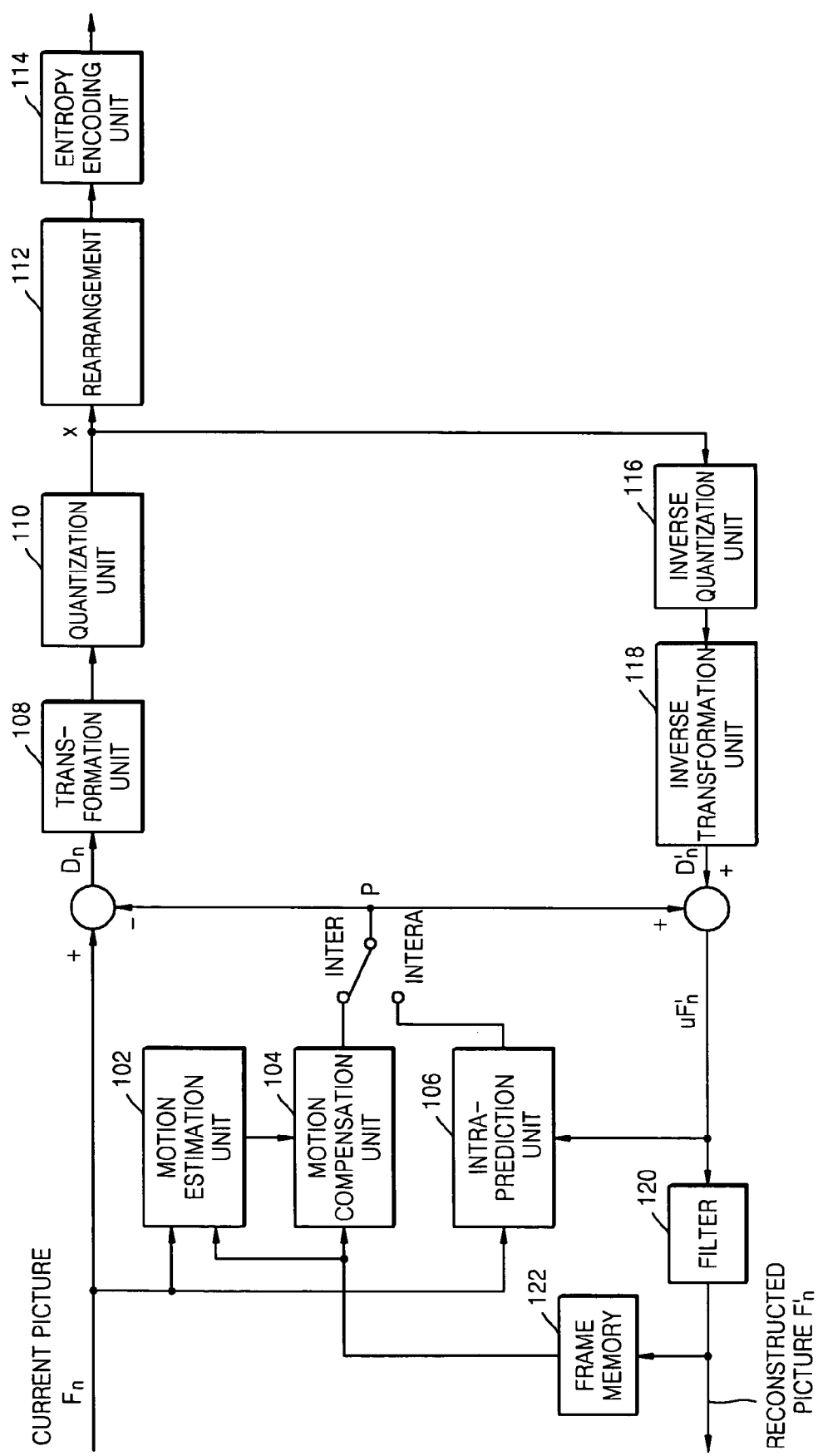
FIG. 5 is a block diagram of an image encoder to which an apparatus for image intraprediction encoding according to an exemplary embodiment of the present invention is applied.

FIG. 5 is a block diagram of an image encoder 100 to which an apparatus for image intraprediction encoding according to an exemplary embodiment of the present invention is applied.

Referring to FIG. 5, the image encoder 100 includes a motion estimation unit 102, a motion compensation unit 104, an intraprediction unit 106, a transformation unit 108, a quantization unit 110, a rearrangement unit 112, an entropy-encoding unit 114, an inverse quantization unit 116, an inverse transformation unit 118, a filter 120, and a frame memory 122. The intraprediction unit 106 is the apparatus for image intraprediction encoding according to an exemplary embodiment of the present invention.

For intraprediction, the motion estimation unit 102 searches a reference picture for a prediction value of a macroblock of a current picture. When a reference block is founded in units of ½ pixels or ¼ pixels, the motion compensation unit 104 calculates the median pixel value of the reference block to determine reference block data. Interprediction is performed in this way by the motion estimation unit 102 and the motion compensation unit 104.

The intraprediction unit 106 searches a current picture for a prediction value of a macroblock of the current picture for intraprediction. In particular, the intraprediction unit 106 according to an exemplary embodiment of the present invention divides an input macroblock into sub-blocks of a predetermined size and performs intraprediction on each of the sub-blocks according to a predetermined block processing order that is different from a conventional block processing order. More specifically, the intraprediction unit 106 performs intraprediction according to a predetermined sub-block processing order that allows the use of pixel values of sub-blocks located below and/or to the right of a current sub-block to be intrapredicted, thereby providing high compression efficiency according to the characteristic of an image.

Once prediction data to be referred to by a macroblock of a current frame is found through interprediction or intraprediction, it is extracted from the macroblock of the current frame, transformed by the transformation unit 108, and then quantized by the quantization unit 110. The portion of the macroblock of the current frame remaining after subtracting a motion-estimated reference block is referred to as a residue. In general, the residue is encoded to reduce the amount of data in image encoding. The quantized residue is processed by the rearrangement unit 112 and encoded in the entropy-encoding unit 114.

To obtain a reference picture used for interprediction, a quantized picture is processed by the inverse quantization unit 116 and the inverse transformation unit 118 and thus, a current picture is reconstructed. The reconstructed current picture is processed by the filter 120 performing deblocking filtering, and is then stored in the frame memory 122 for use in interprediction of a next picture.

Figure 6:
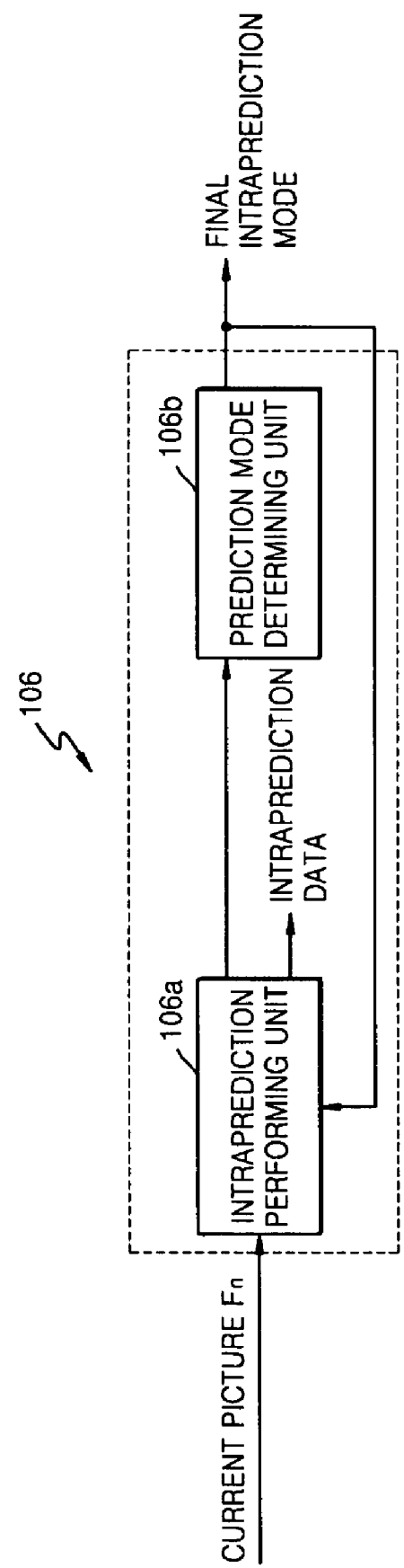
FIG. 6 is a block diagram of an intraprediction unit of FIG. 5.

FIG. 6 is a block diagram of the intraprediction unit 106 of FIG. 5.

Referring to FIG. 6, the intraprediction unit 106 includes an intraprediction performing unit 106a and a prediction mode determining unit 106b.

The intraprediction performing unit 106a forms a predicted image by performing intraprediction in units of sub-blocks of various sizes. More specifically, the intraprediction performing unit 106a divides an input block into sub-blocks of a predetermined size and performs intraprediction on each input block and each sub-block. For example, if a 16×16 macroblock is input, the intraprediction performing unit 106a performs intraprediction on the 16×16 macroblock, divides the 16×16 macroblock into 8×8 or 4×4 sub-blocks, and then performs intraprediction on each of the 8×8 or 4×4 sub-blocks.

In particular, the intraprediction performing unit 106a performs intraprediction on each of the 8×8 or 4×4 sub-blocks according to a new sub-block processing order progressing horizontally and vertically from sub-blocks at four corners of the divided macroblock in addition to a conventional block processing order according to a conventional raster scan scheme in which blocks are processed left-to-right and top-to-bottom. The new sub-block processing order can provide higher compression efficiency according to the characteristic of an image. This is because correlation between adjacent blocks referred to for intraprediction can be improved according to a processing order of blocks to be intrapredicted when an image has a specific directivity, and thus the size of a residue to be compression encoded is reduced.

FIGS. 7A through 7J illustrate processing orders in which the intraprediction performing unit 106a processes sub-blocks. FIGS. 8A through 8J illustrate possible intraprediction directions corresponding to the processing orders illustrated in FIGS. 7A through 7J. In FIGS. 7A through 7J, it is assumed that the outermost square indicates a 16×16 macroblock and 16 squares included in the outermost square indicate 4×4 sub-blocks. In addition, a dashed 5$^{th}$ sub-block indicates a current sub-block to be intrapredicted and a marked area adjacent to the 5$^{th}$ sub-block indicates pixels of adjacent sub-blocks that can be used for intraprediction of the 5$^{th}$ sub-block. Reference numbers 10a through 10g in FIGS. 7A through 7G indicate image directions for which the sub-block processing orders illustrated in FIGS. 7A through 7G can be suitably used.

As stated above, the intraprediction performing unit 106a performs intraprediction according to a predetermined sub-block processing order from sub-blocks at one of the four corners of a macroblock. When intraprediction is performed according to the predetermined sub-block processing order, pixel values of at least adjacent sub-blocks located to the right of and/or below a current sub-block are used.

Figure 7A:
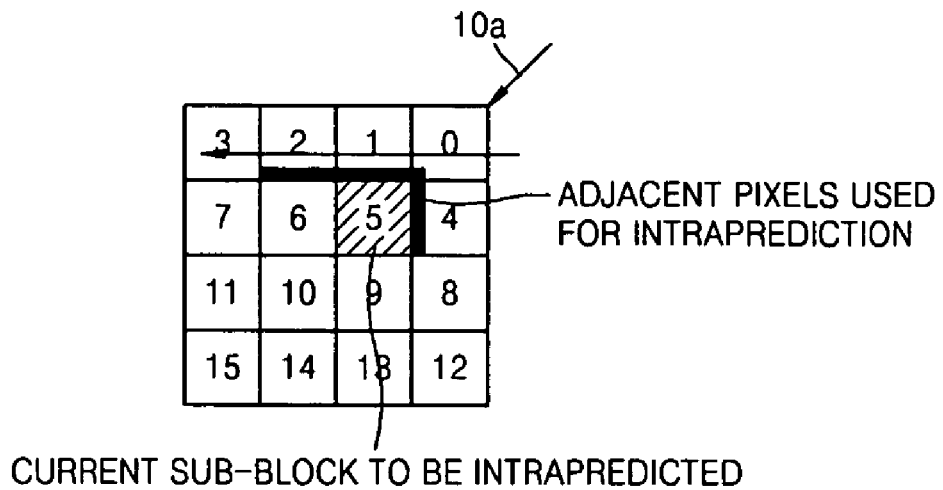

Referring to FIG. 7A, when intraprediction is performed in order from a 0$^{th}$ sub-block to a 15$^{th}$ sub-block according to a sub-block processing order expressed as a matrix $$\begin{bmatrix} 3 & 2 & 1 & 0 \\ 7 & 6 & 5 & 4 \\ 11 & 10 & 9 & 8 \\ 15 & 14 & 13 & 12 \end{bmatrix},$$

intraprediction can be performed on each current sub-block using pixel values of adjacent sub-blocks located to the right of and above the current sub-block.

Figure 7B:
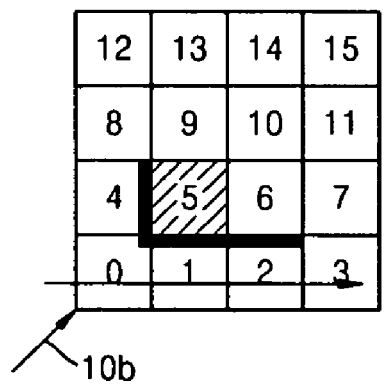

Referring to FIG. 7B, when intraprediction is performed in order from a 0$^{th}$ sub-block to a 15$^{th}$ sub-block according to a sub-block processing order expressed as a matrix $$\begin{bmatrix} 12 & 13 & 14 & 15 \\ 8 & 9 & 10 & 11 \\ 4 & 5 & 6 & 7 \\ 0 & 1 & 2 & 3 \end{bmatrix}.$$

intraprediction can be performed on each current sub-block using pixel values of adjacent sub-blocks located to the left of and below the current sub-block.

Figure 7C:
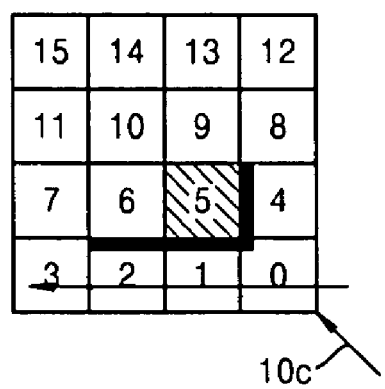

Referring to FIG. 7C, when intraprediction is performed in order from a 0$^{th}$ sub-block to a 15$^{th}$ sub-block according to a sub-block processing order expressed as a matrix $$\begin{bmatrix} 15 & 14 & 13 & 12 \\ 11 & 10 & 9 & 8 \\ 7 & 6 & 5 & 4 \\ 3 & 2 & 1 & 0 \end{bmatrix},$$

intraprediction can be performed on each current sub-block using pixel values of adjacent sub-blocks located to the right of and below the current sub-block.

Figure 7D:
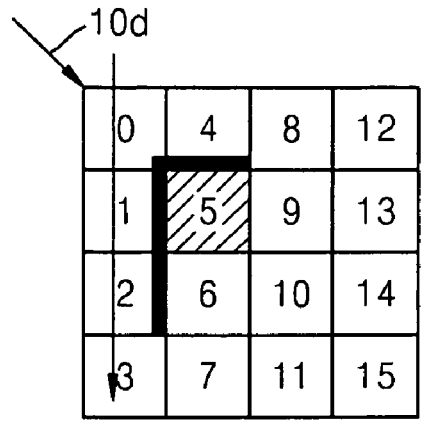

Referring to FIG. 7D, when intraprediction is performed in order from a 0$^{th}$ sub-block to a 15$^{th}$ sub-block according to a sub-block processing order expressed as a matrix $$\begin{bmatrix} 0 & 4 & 8 & 12 \\ 1 & 5 & 9 & 13 \\ 2 & 6 & 10 & 14 \\ 3 & 7 & 11 & 15 \end{bmatrix},$$

intraprediction can be performed on each current sub-block using pixel values of adjacent sub-blocks located to the left of and above the current sub-block.

Figure 7E:
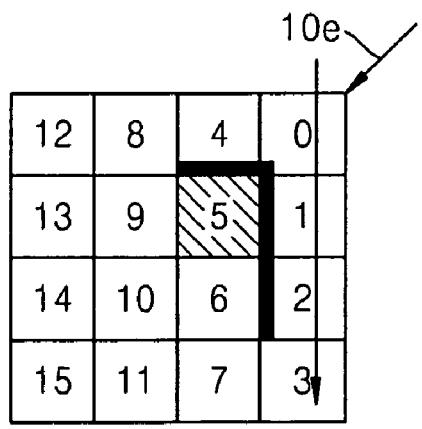

Referring to FIG. 7E, when intraprediction is performed in order from a 0$^{th}$ sub-block to a 15$^{th}$ sub-block according to a sub-block processing order expressed as a matrix $$\begin{bmatrix} 12 & 8 & 4 & 0 \\ 13 & 9 & 5 & 1 \\ 14 & 10 & 6 & 2 \\ 15 & 11 & 7 & 3 \end{bmatrix},$$

intraprediction can be performed on each current sub-block using pixel values of adjacent sub-blocks located to the left of and above the current sub-block.

Figure 7F:
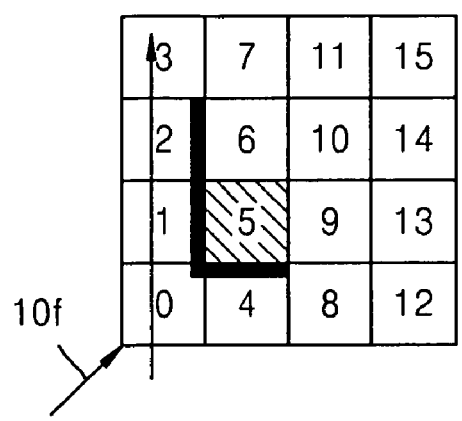
Figure 8A:
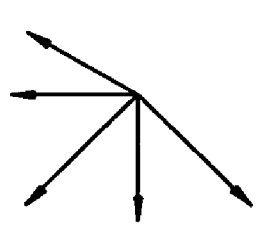
FIGS. 8A through 8J illustrate possible intraprediction directions corresponding to the processing orders illustrated in FIGS. 7A through 7J.
Figure 8B:
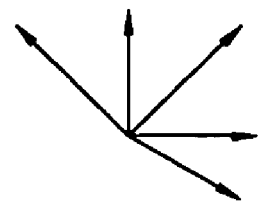
Figure 8C:
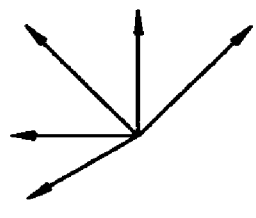
Figure 8D:
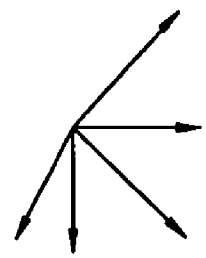
Figure 8E:
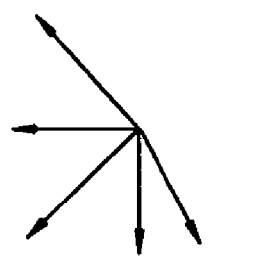
Figure 8F:
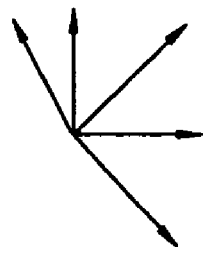
Figure 8G:
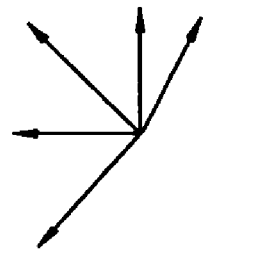
Figure 8H:
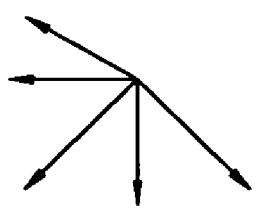
Figure 8I:
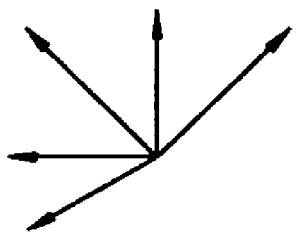
Figure 8J:
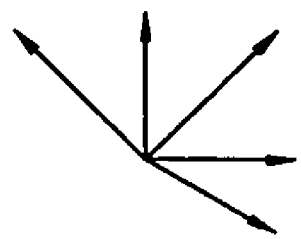

Referring to FIG. 7F, when intraprediction is performed in order from a 0$^{th}$ sub-block to a 15$^{th}$ sub-block according to a sub-block processing order expressed as a matrix $$\begin{bmatrix} 3 & 7 & 11 & 15 \\ 2 & 6 & 10 & 14 \\ 1 & 5 & 9 & 13 \\ 0 & 4 & 8 & 12 \end{bmatrix},$$

intraprediction can be performed on each current sub-block using pixel values of adjacent sub-blocks located to the left of and below the current sub-block.

Referring to FIG. 7G, when intraprediction is performed in order from a 0$^{th}$ sub-block to a 15$^{th}$ sub-block according to a sub-block processing order expressed as a matrix $$\begin{bmatrix} 15 & 11 & 7 & 3 \\ 14 & 10 & 6 & 2 \\ 13 & 9 & 5 & 1 \\ 12 & 8 & 4 & 0 \end{bmatrix},$$

intraprediction can be performed on each current sub-block using pixel values of adjacent sub-blocks located to the right of and below the current sub-block.

As illustrated in FIGS. 7H through 7J, the intraprediction performing unit 106a can perform intraprediction using pixel values of adjacent sub-blocks located to the right and/or below a current sub-block by changing the 4×4 block processing order according to the H.264 standard illustrated in FIGS. 4A and 4b.

In other words, when intraprediction is performed in order from a $0^{th}$ sub-block to a $15^{th}$ sub-block according to sub-block processing orders expressed as matrices $$\begin{bmatrix} 5 & 4 & 1 & 0 \\ 7 & 6 & 3 & 2 \\ 13 & 12 & 9 & 8 \\ 13 & 14 & 11 & 10 \end{bmatrix}, \begin{bmatrix} 15 & 13 & 7 & 5 \\ 14 & 12 & 6 & 4 \\ 11 & 9 & 3 & 1 \\ 10 & 8 & 2 & 0 \end{bmatrix}, \text{ and } \begin{bmatrix} 10 & 11 & 14 & 15 \\ 8 & 9 & 12 & 13 \\ 2 & 3 & 6 & 7 \\ 0 & 1 & 4 & 5 \end{bmatrix},$$

intraprediction can be performed on each current sub-block using pixel values of adjacent sub-blocks located to the right of and below the current sub-block. Reference numbers 10h through 10j in FIGS. 7H through 7J indicate image directions in which the sub-block processing orders illustrated in FIGS. 7H through 7J can be suitably used.

Figure 3:
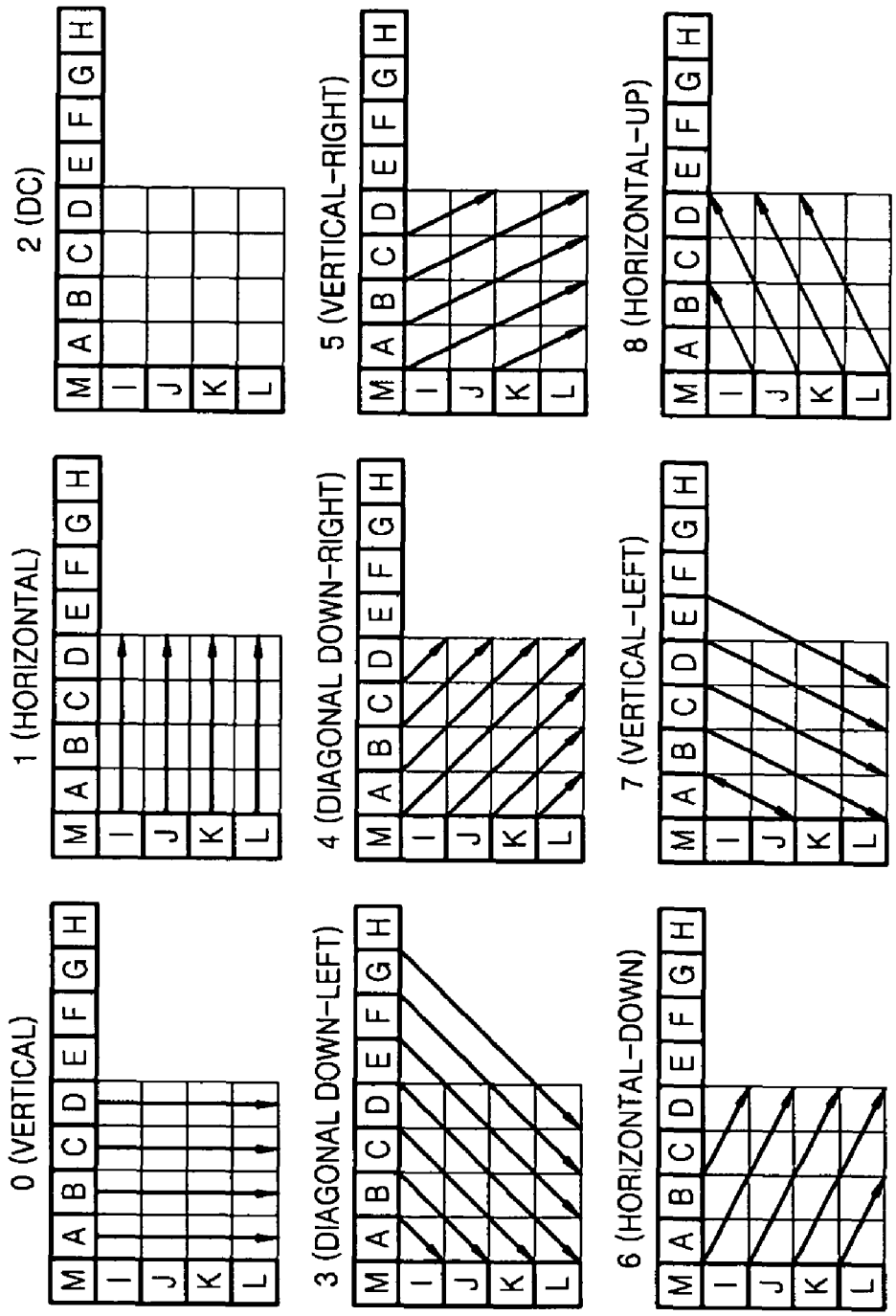
FIG. 3 illustrates 4×4 intra modes used in the H.264 standard according to the prior art.

Referring to FIGS. 8A through 8J illustrating intraprediction directions corresponding to FIGS. 7A through 7J, like the intraprediction directions used in 4×4 intraprediction modes according to the H.264 standard illustrated in FIG. 3, the intraprediction performing unit 106a can form a predicted block by predicting a pixel value of a current sub-block to be encoded using pixel values of adjacent sub-blocks that are already processed according to various sub-block processing orders.

In intraprediction according to the sub-block processing orders of an exemplary embodiment of the present invention, intraprediction directions (modes) can be indicated using the same indices as the conventional indices and the intraprediction directions indicated by the indices have various directivities to indicate pixels of adjacent blocks that can be used for intraprediction of sub-block. In other words, when intraprediction is performed according to the sub-block processing orders illustrated in FIGS. 7A through 7J, an index indicating a conventional prediction direction (or mode) may be used instead of setting a separate index indicating an intraprediction direction (or mode) for each block processing order. For example, when intraprediction is performed according to a block processing order illustrated in FIG. 7A, the intraprediction performing unit 106a performs intraprediction using pixel values of adjacent blocks according to one of the prediction directions illustrated in FIG. 8A. At this time, when i is an index indicating the prediction direction, i=0 indicates a conventional vertical mode, i=1 indicates a modified horizontal mode in which samples adjacently to the right of a current block to be intrapredicted are expanded horizontally, i=2 indicates a conventional DC mode, i=3 indicates a conventional diagonal down-left mode, and i=4 indicates a conventional diagonal down-right mode. In other words, when intraprediction is performed according to block processing orders as illustrated in FIGS. 7A through 7J, indices indicating conventional prediction directions are used, instead of setting separate indices to indicate the intraprediction directions as illustrated in FIGS. 8A through 8J. However, the intraprediction directions indicated by the indices should be properly adjusted so that the pixels of previously processed adjacent blocks according to the block processing orders according to an exemplary embodiment of the present invention can be used.

Referring back to FIG. 6, the prediction mode determining unit 106b calculates a cost of an image intrapredicted by the intraprediction performing unit 106a and determines a final intraprediction mode to be an intraprediction mode having the smallest cost among intraprediction modes using sub-block units of various sizes and predetermined sub-block processing orders. In other words, the prediction mode determining unit 106b compares costs calculated using residues between the original image and an image intrapredicted by the intraprediction performing unit 106a in units of a 16×16 block, an image intrapredicted in units of 8×8 sub-blocks in a predetermined sub-block processing order according to an exemplary embodiment of the present invention, and an image intrapredicted in units of 4×4 sub-blocks in a predetermined sub-block processing order according to an exemplary embodiment of the present invention, thereby determining the final intraprediction mode to be used for intraprediction of a current image. Here, cost calculation may be performed using various methods such as a sum of absolute difference (SAD) cost function, a sum of absolute transformed difference (SATD) cost function, a sum of squares difference (SSD) cost function, a mean of absolute difference (MAD) cost function, and a Lagrange cost function. An SAD is a sum of absolute values of prediction residues of 4×4 blocks. An SATD is a sum of absolute values of coefficients obtained by applying a Hadamard transform to prediction residues of 4×4 blocks. An SSD is a sum of the squares of prediction residues of 4×4 block prediction samples. An MAD is an average of absolute values of prediction residues of 4×4 block prediction samples. The Lagrange cost function is a modified cost function including bitstream length information.

The prediction mode determining unit 106b adds information about the determined intraprediction mode, i.e., information about the size of a sub-block used for intraprediction and a predetermined sub-block processing order, to a header of a bitstream to be encoded.

Figure 9:
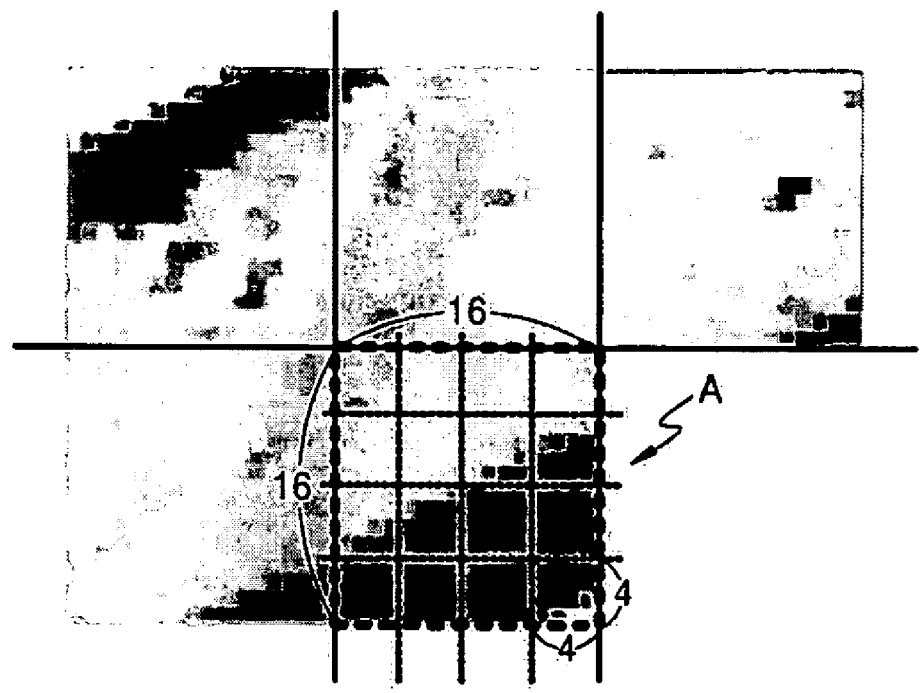
FIG. 9 illustrates an image to be encoded by an apparatus for image intraprediction encoding according to an exemplary embodiment of the present invention.
Figure 10:
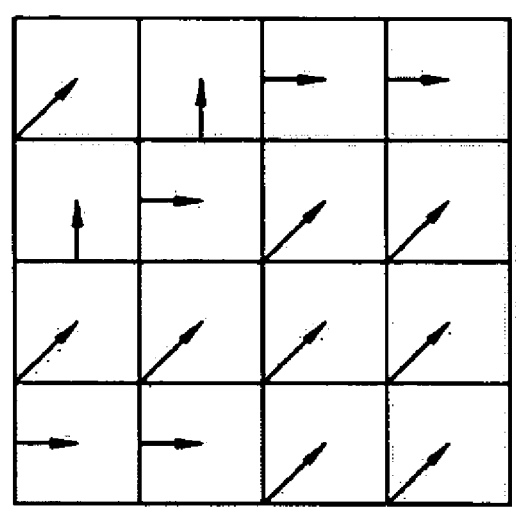
FIG. 10 illustrates intraprediction directions of sub-blocks included in a macroblock of FIG. 9.

FIG. 9 illustrates an image encoded by an apparatus for image intraprediction encoding according to an exemplary embodiment of the present invention, and FIG. 10 illustrates intraprediction directions of sub-blocks included in a macroblock A of the image of FIG. 9 when the macroblock A is intrapredicted by the apparatus for image intraprediction encoding according to an exemplary embodiment of the present invention.

Referring to FIG. 9, the current macroblock A to be encoded includes an edge component extending from the bottom left corner to the top right corner. In this case, the current macroblock A is encoded with a smaller cost when it is intrapredicted according to the sub-block processing order expressed as the matrix $$\begin{bmatrix} 12 & 13 & 14 & 15 \\ 8 & 9 & 10 & 11 \\ 4 & 5 & 6 & 7 \\ 0 & 1 & 2 & 3 \end{bmatrix}$$

as illustrated in FIG. 7B than when it is intrapredicted according to a conventional raster scan scheme. Thus, when an image having a specific directivity as illustrated in FIG. 9 is intrapredicted, by performing intraprediction in units of sub-blocks of various sizes according to various sub-block processing orders, determining an intraprediction mode having the smallest cost, and performing intraprediction in the determined intraprediction mode instead of using a conventional uniform sub-block processing order, high compression efficiency can be achieved, though the time required for encoding increases. Referring to FIG. 10, it can be seen that sub-block processing orders according to various exemplary embodiments of the present invention can well reflect the directivity of an image by allowing the appropriate selection of pixels of adjacent sub-blocks for use in the intraprediction of each sub-block.

Figure 11:
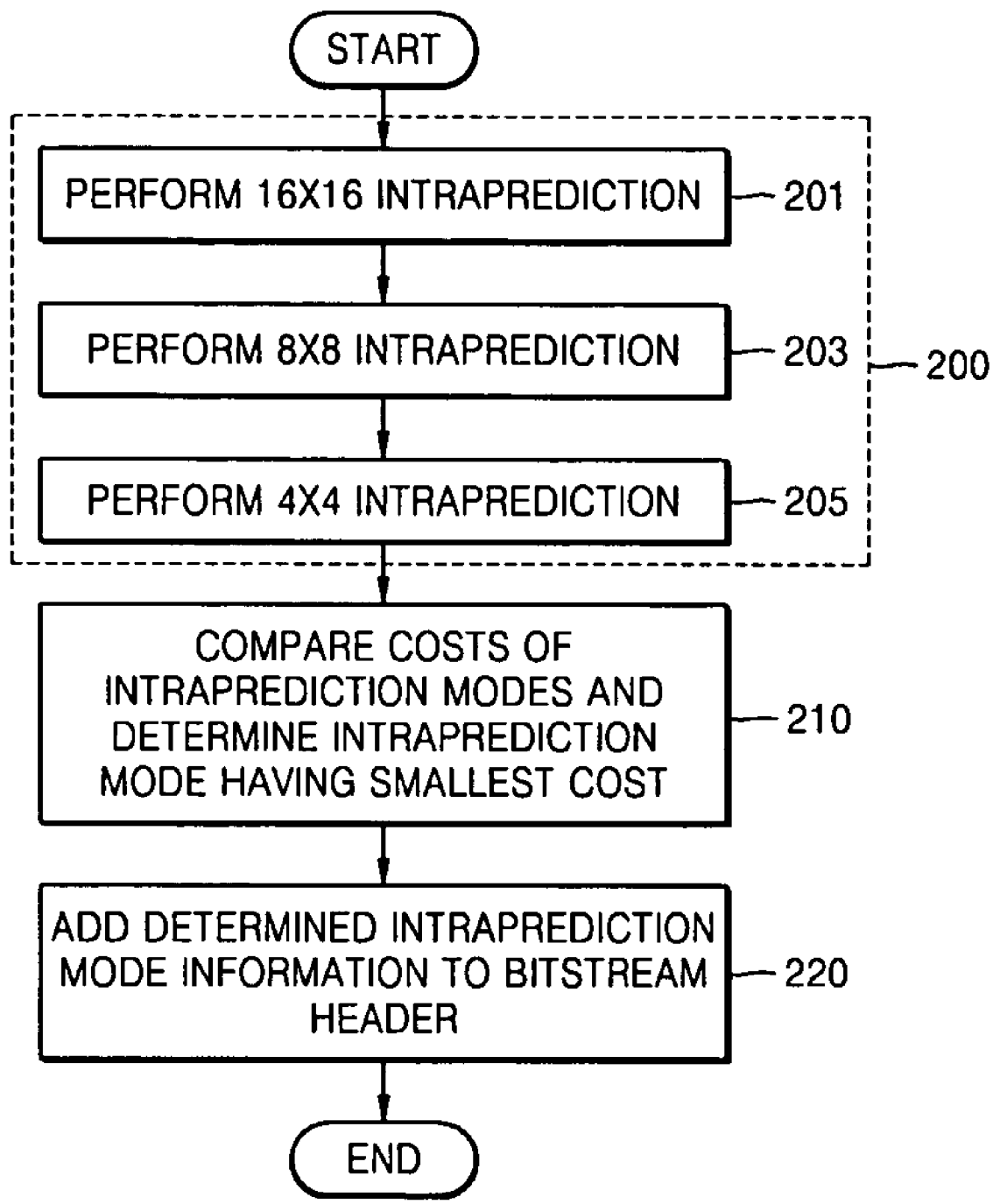
FIG. 11 is a flowchart illustrating a method of image intraprediction encoding according to an exemplary embodiment of the present invention.

FIG. 11 is a flowchart illustrating a method of image intraprediction encoding according to an exemplary embodiment of the present invention.

First, intraprediction is performed on an image to be encoded in units of blocks of a predetermined size in operation 200. More specifically, an input image is intrapredicted in units of 16×16 macroblocks in operation 201, and the 16×16 macroblocks are divided into 8×8 sub-blocks and intraprediction is performed in units of the 8×8 sub-blocks in operation 203. The 16×16 macroblock is divided into 4×4 sub-blocks and intraprediction is performed in units of the 4×4 sub-blocks in operation 205. In particular, when intraprediction is performed in units of the 4×4 sub-blocks, intraprediction is performed according to predetermined sub-block processing orders illustrated in FIGS. 7A through 7J, thereby allowing the use of pixel values of adjacent blocks located to the right of and/or below a current block for intraprediction.

When intraprediction is performed in units of an 8×8 sub-block, intraprediction can be performed according to sub-block processing orders expressed as matrices $$\begin{bmatrix} 3 & 0 \\ 1 & 2 \end{bmatrix}, \begin{bmatrix} 2 & 0 \\ 3 & 1 \end{bmatrix}, \begin{bmatrix} 1 & 0 \\ 3 & 2 \end{bmatrix}, \begin{bmatrix} 3 & 1 \\ 2 & 0 \end{bmatrix}, \begin{bmatrix} 3 & 2 \\ 1 & 0 \end{bmatrix}, \begin{bmatrix} 2 & 3 \\ 0 & 1 \end{bmatrix}, \text{ and } \begin{bmatrix} 1 & 3 \\ 0 & 2 \end{bmatrix}$$

in addition to a conventional sub-block processing order.

Next, costs of images intrapredicted in units of blocks of various sizes and according to predetermined block processing orders are compared and an intraprediction mode having the smallest cost is determined to be a final intraprediction mode. Intraprediction is performed on a current input block using the final intraprediction mode in operation 210.

Information about the final intraprediction mode is added to a header of a compression encoded bitstream in operation 220 for efficient image decoding by providing information about the size of sub-blocks and a sub-block processing order used for intraprediction to an image decoder. Here, the information about the determined intraprediction mode can be indicated by adding mode bits indicating the size of a sub-block and a sub-block processing order to a syntax.

In the intraprediction of an 8×8 sub-block, a sub-block processing order can be changed such that pixel values of adjacent blocks located the right of and/or below the 8×8 sub-block can be used.

Figure 12:
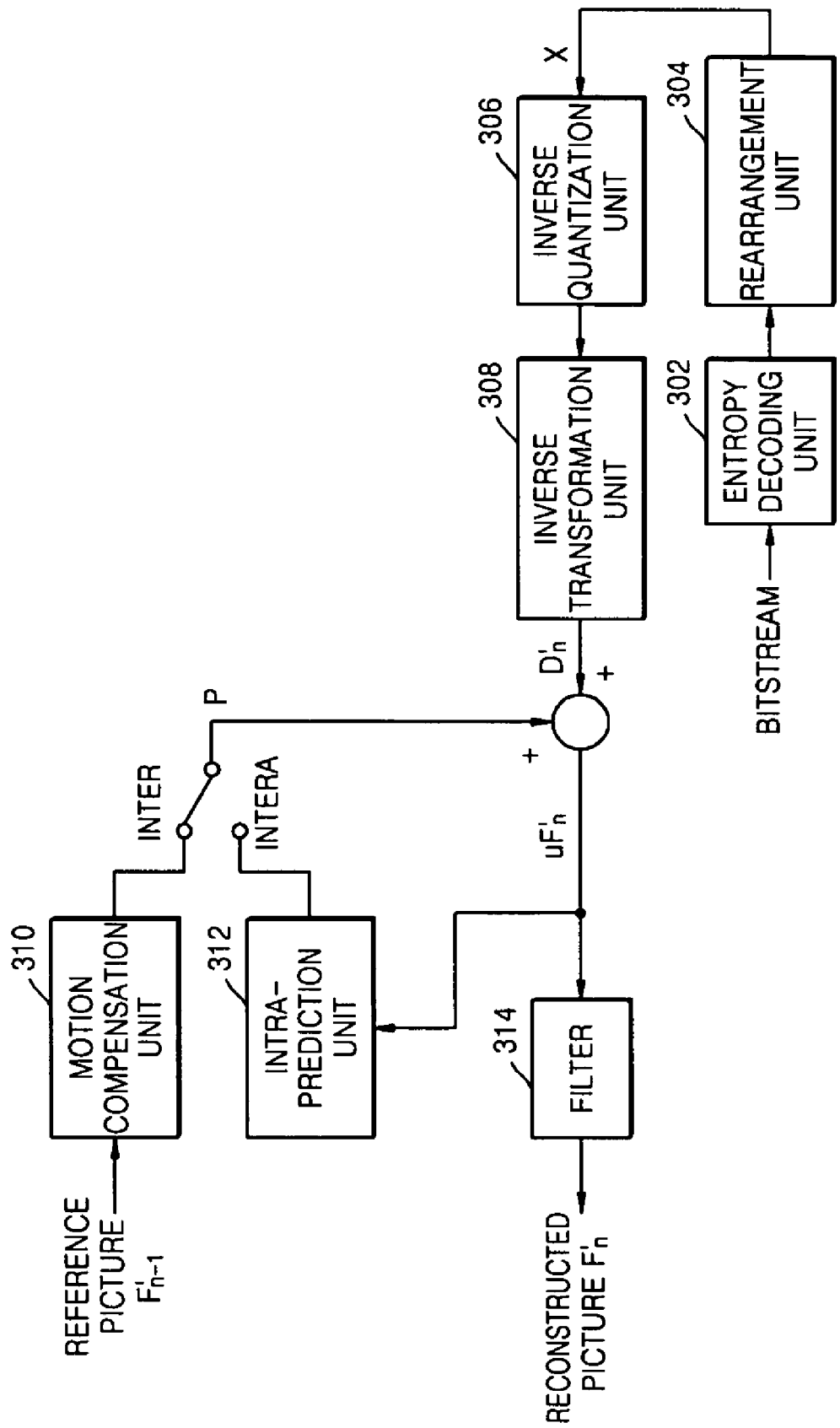
FIG. 12 is a block diagram of an image decoder to which an apparatus for image intraprediction decoding according to an exemplary embodiment of the present invention is applied.

FIG. 12 is a block diagram of an image decoder to which an apparatus for image intraprediction decoding according to an exemplary embodiment of the present invention is applied.

Referring to FIG. 12, the image decoder includes an entropy-decoding unit 302, a rearrangement unit 304, an inverse quantization unit 306, an inverse transformation unit 308, a motion compensation unit 310, an intraprediction unit 312, and a filter 314.

The entropy-decoding unit 302 and the rearrangement unit 304 receive a compressed bitstream and perform entropy decoding, thereby generating a quantized coefficient X. The inverse quantization unit 306 and the inverse transformation unit 308 perform inverse quantization and an inverse transformation on the quantized coefficient X, thereby extracting transformation encoding coefficients, motion vector information, and header information. The motion compensation unit 310 and the intraprediction unit 312 generate a predicted block according to an encoded picture type using the decoded header information, and the predicted block is added to an error $D'_n$ to generate $uF'_n$. The $uF'_n$ is processed by the filter 314, and thus, a reconstructed picture $F'_n$ is generated.

In particular, the intraprediction unit 312 determines the size of sub-blocks and a sub-block processing order used for intraprediction using intraprediction mode information included in a header of the bitstream. The intraprediction unit 312 performs intraprediction according to the determined sub-block processing order to generate a predicted block and adds a residue to the predicted block, thereby reconstructing the original image.

Figure 13:
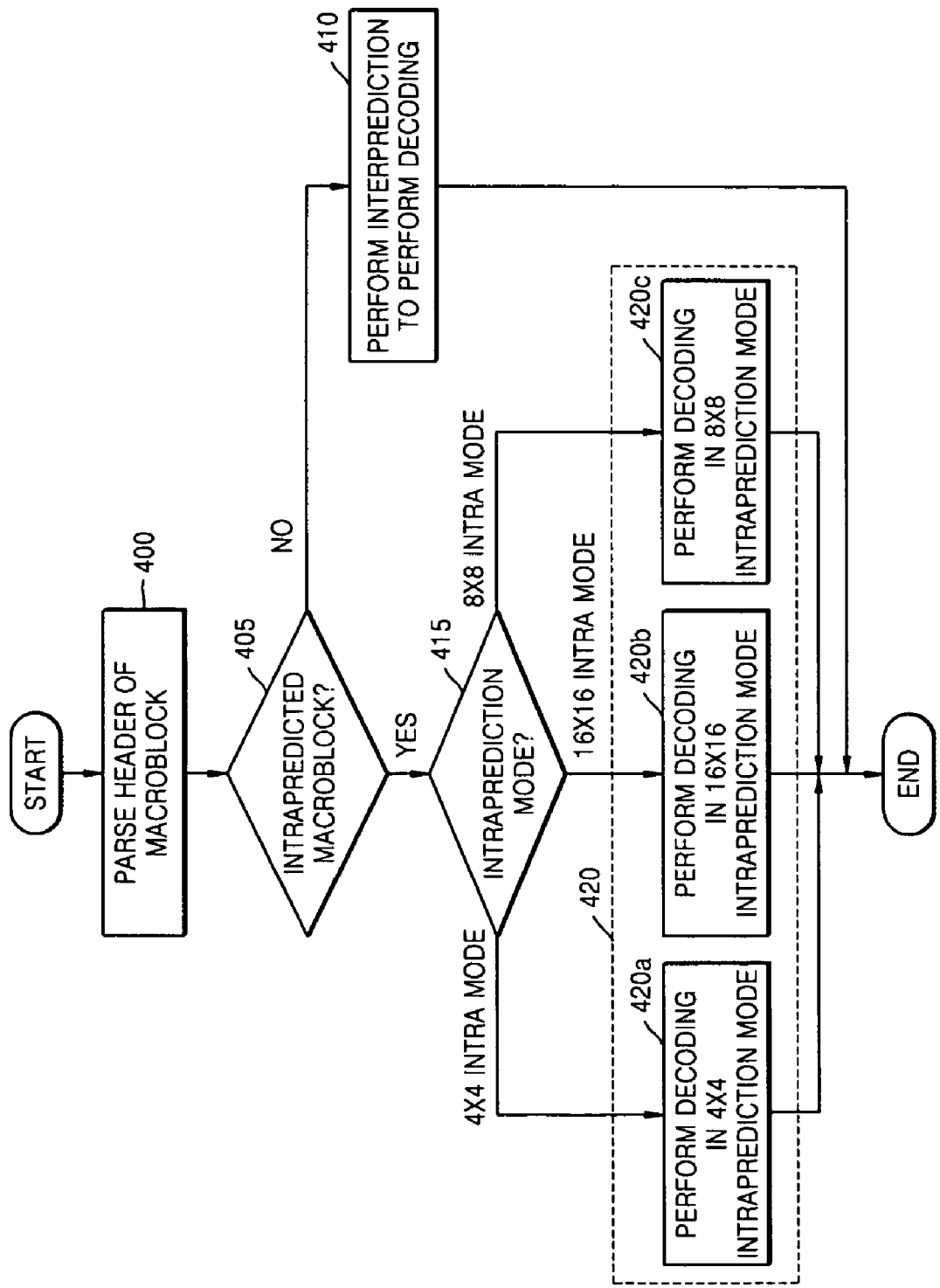
FIG. 13 is a flowchart illustrating a method of image intraprediction decoding according to an exemplary embodiment of the present invention.

FIG. 13 is a flowchart illustrating a method of image intraprediction decoding according to an exemplary embodiment the present invention.

Referring to FIG. 13, intraprediction mode information is extracted by parsing a header of a macroblock included in an input bitstream in operation 400.

It is determined whether a current macroblock to be decoded is an intrapredicted macroblock or interpredicted macroblock using the extracted intraprediction mode information in operation 405. When the current macroblock is an interpredicted macroblock, interprediction in which a predicted block is generated from a reference picture is performed according to the prior art, thereby performing decoding in operation 410.

If the current macroblock is an intrapredicted macroblock, an intraprediction mode used for the current macroblock is determined in operation 415.

A predicted block of the current macroblock is generated by performing intraprediction according to the determined intraprediction mode, thereby performing decoding in operation 420. More specifically, when the current macroblock has been intrapredicted in a 16×16 intra mode, conventional intraprediction is performed in operation 420b. When the current macroblock has been intrapredicted in a 4×4 intra mode or an 8×8 intra mode, information about a sub-block processing order is extracted from the intraprediction mode information and intraprediction is performed according to the sub-block processing order to generate a predicted block, thereby performing decoding in operations 420a or 420c.

As described above, according to an exemplary embodiment of the present invention, by performing intraprediction according to various sub-block processing orders in addition to a conventional block processing order, image compression efficiency may be improved.

The present invention may also be embodied as computer-readable code on a computer-readable recording medium. The computer-readable recording medium is any data storage device that can store data which can be thereafter read by a computer system. Examples of the computer-readable recording medium include a read-only memory (ROM), a random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of image intraprediction encoding, the method comprising:
    dividing an input block into first sub-blocks of a predetermined size; and
    performing intraprediction encoding on the first sub-blocks according to a first sub-block processing order using pixel values of at least one of an adjacent sub-block located to the right of the first sub-blocks and an adjacent sub-block located below the first sub-blocks,
    wherein when the input block is divided into 16 sub-blocks, the first sub-block processing order is expressed as one of matrices $$\begin{bmatrix} 3 & 2 & 1 & 0 \\ 7 & 6 & 5 & 4 \\ 11 & 10 & 9 & 8 \\ 15 & 14 & 13 & 12 \end{bmatrix}, \begin{bmatrix} 12 & 13 & 14 & 15 \\ 8 & 9 & 10 & 11 \\ 4 & 5 & 6 & 7 \\ 0 & 1 & 2 & 3 \end{bmatrix}, \begin{bmatrix} 15 & 14 & 13 & 12 \\ 11 & 10 & 9 & 8 \\ 7 & 6 & 5 & 4 \\ 3 & 2 & 1 & 0 \end{bmatrix},$$

$$\begin{bmatrix} 0 & 4 & 8 & 12 \\ 1 & 5 & 9 & 13 \\ 2 & 6 & 10 & 14 \\ 3 & 7 & 11 & 15 \end{bmatrix}, \begin{bmatrix} 12 & 8 & 4 & 0 \\ 13 & 9 & 5 & 1 \\ 14 & 10 & 6 & 2 \\ 15 & 11 & 7 & 3 \end{bmatrix}, \begin{bmatrix} 3 & 7 & 11 & 15 \\ 2 & 6 & 10 & 14 \\ 1 & 5 & 9 & 13 \\ 0 & 4 & 8 & 12 \end{bmatrix}, \begin{bmatrix} 15 & 11 & 7 & 3 \\ 14 & 10 & 6 & 2 \\ 13 & 9 & 5 & 1 \\ 12 & 8 & 4 & 0 \end{bmatrix},$$

$$\begin{bmatrix} 5 & 4 & 1 & 0 \\ 7 & 6 & 3 & 2 \\ 12 & 12 & 9 & 8 \\ 13 & 14 & 11 & 10 \end{bmatrix}, \begin{bmatrix} 15 & 13 & 7 & 15 \\ 14 & 12 & 6 & 14 \\ 11 & 9 & 3 & 13 \\ 10 & 8 & 2 & 12 \end{bmatrix}, \text{ or } \begin{bmatrix} 10 & 11 & 14 & 15 \\ 8 & 9 & 12 & 13 \\ 2 & 3 & 6 & 7 \\ 0 & 1 & 4 & 5 \end{bmatrix}.$$

2. The method of claim 1, wherein intraprediction directions in intraprediction according to the first sub-block processing order have different directivities to indicate pixels of adjacent blocks used for the intraprediction of current first sub-blocks.

3. The method of claim 1, further comprising:
    dividing the input block into second sub-blocks different in size than the first sub-blocks;
    performing intraprediction encoding on the second sub-blocks; and
    comparing a cost of the first sub-blocks and a cost of the second sub-blocks and determining a final intraprediction mode for the input block.

4. The method of claim 3, wherein there are four of the second sub-blocks, the second sub-blocks are obtained by dividing the input block into four, and the second sub-blocks are intrapredicted according to one of second sub-block processing orders represented as matrices $$\begin{bmatrix} 3 & 0 \\ 1 & 2 \end{bmatrix}, \begin{bmatrix} 2 & 0 \\ 3 & 1 \end{bmatrix}, \begin{bmatrix} 1 & 0 \\ 3 & 2 \end{bmatrix}, \begin{bmatrix} 3 & 1 \\ 2 & 0 \end{bmatrix}, \begin{bmatrix} 3 & 2 \\ 1 & 0 \end{bmatrix}, \begin{bmatrix} 2 & 3 \\ 0 & 1 \end{bmatrix}, \text{ and } \begin{bmatrix} 1 & 3 \\ 0 & 2 \end{bmatrix}.$$

5. The method of claim 3, further comprising adding information about the determined intraprediction mode to a header of a bitstream of an encoded image.

6. An apparatus for image intraprediction encoding, the apparatus comprising an intraprediction unit dividing an input block into first sub-blocks of a predetermined size and performing intraprediction encoding on the first sub-blocks according to a first sub-block processing order using pixel values of at least one of an adjacent sub-block located to the right of the first sub-blocks and an adjacent sub-block located below the first sub-blocks,
    wherein when the input block is divided into 16 sub-blocks, the first sub-block processing order is expressed as one of matrices $$\begin{bmatrix} 3 & 2 & 1 & 0 \\ 7 & 6 & 5 & 4 \\ 11 & 10 & 9 & 8 \\ 15 & 14 & 13 & 12 \end{bmatrix}, \begin{bmatrix} 12 & 13 & 14 & 15 \\ 8 & 9 & 10 & 11 \\ 4 & 5 & 6 & 7 \\ 0 & 1 & 2 & 3 \end{bmatrix}, \begin{bmatrix} 15 & 14 & 13 & 12 \\ 11 & 10 & 9 & 8 \\ 7 & 6 & 5 & 4 \\ 3 & 2 & 1 & 0 \end{bmatrix},$$

$$\begin{bmatrix} 0 & 4 & 8 & 12 \\ 1 & 5 & 9 & 13 \\ 2 & 6 & 10 & 14 \\ 3 & 7 & 11 & 15 \end{bmatrix}, \begin{bmatrix} 12 & 8 & 4 & 0 \\ 13 & 9 & 5 & 1 \\ 14 & 10 & 6 & 2 \\ 15 & 11 & 7 & 3 \end{bmatrix}, \begin{bmatrix} 3 & 7 & 11 & 15 \\ 2 & 6 & 10 & 14 \\ 1 & 5 & 9 & 13 \\ 0 & 4 & 8 & 12 \end{bmatrix}, \begin{bmatrix} 15 & 11 & 7 & 3 \\ 14 & 10 & 6 & 2 \\ 13 & 9 & 5 & 1 \\ 12 & 8 & 4 & 0 \end{bmatrix},$$

$$\begin{bmatrix} 5 & 4 & 1 & 0 \\ 7 & 6 & 3 & 2 \\ 13 & 12 & 9 & 8 \\ 13 & 14 & 11 & 10 \end{bmatrix}, \begin{bmatrix} 15 & 13 & 7 & 5 \\ 14 & 12 & 6 & 4 \\ 11 & 9 & 3 & 1 \\ 10 & 8 & 2 & 0 \end{bmatrix}, \text{ or } \begin{bmatrix} 10 & 11 & 14 & 15 \\ 8 & 9 & 12 & 13 \\ 2 & 3 & 6 & 7 \\ 0 & 1 & 4 & 5 \end{bmatrix}.$$

7. The apparatus of claim 6, wherein intraprediction directions in intraprediction according to the first sub-block processing order have different directivities to indicate pixels of adjacent blocks used for the intraprediction of current first sub-blocks.

8. The apparatus of claim 6, wherein the intraprediction unit comprises:
    an intraprediction performing unit which divides the input block into second sub-blocks different in size than the first sub-blocks and performs intraprediction encoding on the second sub-blocks; and
    a prediction mode determining unit which compares a cost of the first sub-blocks and a cost of the second sub-blocks and determines a final intraprediction mode for the input block.

9. The apparatus of claim 8, wherein there are four of the second sub-blocks, the second sub-blocks are obtained by dividing the input block into four, and the second sub-blocks are intrapredicted according to one of second sub-block processing orders represented as matrices $$\begin{bmatrix} 3 & 0 \\ 1 & 2 \end{bmatrix},$$

$$\begin{bmatrix} 2 & 0 \\ 3 & 1 \end{bmatrix},$$

$$\begin{bmatrix} 1 & 0 \\ 3 & 2 \end{bmatrix},$$

$$\begin{bmatrix} 3 & 1 \\ 2 & 0 \end{bmatrix},$$

$$\begin{bmatrix} 3 & 2 \\ 1 & 0 \end{bmatrix},$$

$$\begin{bmatrix} 2 & 3 \\ 0 & 1 \end{bmatrix},$$

and $$\begin{bmatrix} 1 & 3 \\ 0 & 2 \end{bmatrix}.$$

10. The apparatus of claim 8, wherein the prediction mode determining unit adds information about the determined intraprediction mode to a header of a bitstream of an encoded image.

11. A method of image intraprediction decoding in which a bitstream of an encoded image is received and intraprediction decoded, the method comprising:

extracting intraprediction mode information from the bitstream;

selecting, based on the extracted intraprediction mode information, at least one sub-block processing order that allows the use of pixel values of at least one of an adjacent sub-block to the right of and an adjacent sub-block below a current sub-block for intraprediction decoding; and performing intraprediction decoding on sub-blocks according to the selected sub-block processing order, thereby forming a predicted block, wherein the selected sub-block processing order is a sub-block processing order expressed as one of matrices $$\begin{bmatrix} 3 & 2 & 1 & 0 \\ 7 & 6 & 5 & 4 \\ 11 & 10 & 9 & 8 \\ 15 & 14 & 13 & 12 \end{bmatrix},$$

$$\begin{bmatrix} 12 & 13 & 14 & 15 \\ 8 & 9 & 10 & 11 \\ 4 & 5 & 6 & 7 \\ 0 & 1 & 2 & 3 \end{bmatrix},$$

$$\begin{bmatrix} 15 & 14 & 13 & 12 \\ 11 & 10 & 9 & 8 \\ 7 & 6 & 5 & 4 \\ 3 & 2 & 1 & 0 \end{bmatrix},$$

$$\begin{bmatrix} 0 & 4 & 8 & 12 \\ 1 & 5 & 9 & 13 \\ 2 & 6 & 10 & 14 \\ 3 & 7 & 11 & 15 \end{bmatrix},$$

$$\begin{bmatrix} 12 & 8 & 4 & 0 \\ 13 & 9 & 5 & 1 \\ 14 & 10 & 6 & 2 \\ 15 & 11 & 7 & 3 \end{bmatrix},$$

$$\begin{bmatrix} 3 & 7 & 11 & 15 \\ 2 & 6 & 10 & 14 \\ 1 & 5 & 9 & 13 \\ 0 & 4 & 8 & 12 \end{bmatrix},$$

$$\begin{bmatrix} 15 & 11 & 7 & 3 \\ 14 & 10 & 6 & 2 \\ 13 & 9 & 5 & 1 \\ 12 & 8 & 4 & 0 \end{bmatrix},$$

$$\begin{bmatrix} 5 & 4 & 1 & 0 \\ 7 & 6 & 3 & 2 \\ 13 & 12 & 9 & 8 \\ 13 & 14 & 11 & 10 \end{bmatrix},$$

$$\begin{bmatrix} 15 & 13 & 7 & 5 \\ 14 & 12 & 6 & 4 \\ 11 & 9 & 3 & 1 \\ 10 & 8 & 2 & 0 \end{bmatrix},$$

and $$\begin{bmatrix} 10 & 11 & 14 & 15 \\ 8 & 9 & 12 & 13 \\ 2 & 3 & 6 & 7 \\ 0 & 1 & 4 & 5 \end{bmatrix}.$$

12. The method of claim 11, wherein the intraprediction mode information includes information about the size of a predetermined block used for intraprediction.

13. An apparatus for image intraprediction decoding in which a bitstream of an encoded image is received and intraprediction decoded, the apparatus comprising:

an extracting unit which extracts intraprediction mode information from the bitstream; and an intraprediction unit which selects, based on the extracted intraprediction mode information, at least one sub-block processing order that allows the use of pixel values of at least one of an adjacent sub-block to the right of a current sub-block for intraprediction decoding and an adjacent sub-block below the current sub-block for intraprediction decoding, and performing intraprediction decoding on sub-blocks according to the selected sub-block processing order, thereby forming a predicted block, wherein the selected sub-block processing order a sub-block processing order expressed as one of matrices $$\begin{bmatrix} 3 & 2 & 1 & 0 \\ 7 & 6 & 5 & 4 \\ 11 & 10 & 9 & 8 \\ 15 & 14 & 13 & 12 \end{bmatrix},$$

$$\begin{bmatrix} 12 & 13 & 14 & 15 \\ 8 & 9 & 10 & 11 \\ 4 & 5 & 6 & 7 \\ 0 & 1 & 2 & 3 \end{bmatrix},$$

$$\begin{bmatrix} 15 & 14 & 13 & 12 \\ 11 & 10 & 9 & 8 \\ 7 & 6 & 5 & 4 \\ 3 & 2 & 1 & 0 \end{bmatrix},$$

$$\begin{bmatrix} 0 & 4 & 8 & 12 \\ 1 & 5 & 9 & 13 \\ 2 & 6 & 10 & 14 \\ 3 & 7 & 11 & 15 \end{bmatrix},$$

$$\begin{bmatrix} 12 & 8 & 4 & 0 \\ 13 & 9 & 5 & 1 \\ 14 & 10 & 6 & 2 \\ 15 & 111 & 7 & 3 \end{bmatrix},$$

-continued $$\begin{bmatrix} 3 & 7 & 11 & 15 \\ 2 & 6 & 10 & 14 \\ 1 & 5 & 9 & 13 \\ 0 & 4 & 8 & 12 \end{bmatrix},$$

$$\begin{bmatrix} 15 & 11 & 7 & 3 \\ 14 & 10 & 6 & 2 \\ 13 & 9 & 5 & 1 \\ 12 & 8 & 4 & 0 \end{bmatrix},$$

$$\begin{bmatrix} 5 & 4 & 1 & 0 \\ 7 & 6 & 3 & 2 \\ 13 & 12 & 9 & 8 \\ 13 & 14 & 11 & 10 \end{bmatrix},$$

-continued $$\begin{bmatrix} 15 & 13 & 7 & 5 \\ 14 & 12 & 6 & 4 \\ 11 & 9 & 3 & 1 \\ 10 & 8 & 2 & 0 \end{bmatrix},$$

or $$\begin{bmatrix} 10 & 11 & 14 & 15 \\ 8 & 9 & 12 & 13 \\ 2 & 3 & 6 & 7 \\ 0 & 1 & 4 & 5 \end{bmatrix}.$$

14. The apparatus of claim 13, wherein the intraprediction mode information includes information about the size of a predetermined block used for intraprediction.

* * * * *